United States Patent [19]

Stark, Jr.

[11] 4,297,458

[45] Oct. 27, 1981

[54] CURABLE EPOXY RESINS

[75] Inventor: Charles J. Stark, Jr., Clifton Park, N.Y.

[73] Assignee: General Electric Company, Schenectady, N.Y.

[21] Appl. No.: 168,037

[22] Filed: Jul. 14, 1980

[51] Int. Cl.$^3$ ............................................. C08G 59/68
[52] U.S. Cl. .................................. 525/507; 525/523; 528/27; 528/88; 528/92; 528/361; 528/408; 528/411
[58] Field of Search ................ 525/507, 523; 528/88, 528/92, 361, 408, 411

[56] References Cited

U.S. PATENT DOCUMENTS 2,962,410 11/1960 Kohn .................................. 428/371
3,776,978 12/1973 Markovitz ........................ 528/92 X
3,812,214 5/1974 Markovitz ...................... 260/830 TW Primary Examiner—Earl A. Nielsen
Attorney, Agent, or Firm—Peter A. Bielinski; James C. Davis, Jr.; Joseph T. Cohen

[57] ABSTRACT

Curable epoxy resin compositions which exhibit controllable cure rates and extended storage life are described which utilize silyl ethers of catechol as accelerators in combination with certain curing agents. These accelerators can be employed in single package curable epoxy resin compositions useful in molding and casting applications.

33 Claims, No Drawings

CURABLE EPOXY RESINS

This invention is concerned with novel, heat-curable, thermosetting epoxy resin compositions having improved shelf life and a cure rate which can be varied over a broad temperature range utilizing a cure accelerator derived from the silylation of catechol and its derivatives. More particularly, the invention relates to a composition of matter comprising an epoxy resin, a curing agent, and an accelerator (or mixtures of such accelerators) selected from the compounds of the general formula

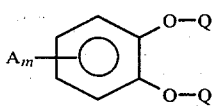
I.

where Q is independently selected from the class consisting of Si—$R_3$ or hydrogen and, R is independently selected from the class consisting of hydrogen, monovalent alkyl (including aralkyl groups of from 1 to 8 carbon atoms (e.g. methyl, ethyl, benzyl, propyl, isopropyl, hexyl, etc.); aryl (e.g. phenyl, naphthyl, etc.); alkaryl, vinyl, and allyl radicals, A is independently selected from alkyl radicals, the same as R above, halogen (e.g., chlorine, bromine, etc.) and the nitro radical, where A can be ortho-, meta-, or para- to either of the —OQ radicals, and m is an integer from 1 to 2, inclusive, with the proviso, that only one Q can be hydrogen, and only one R can be hydrogen on one silicon atom.

The cure accelerators of formula I, which are utilized in the practice of the present invention are disclosed and claimed in my copending application Ser. No. 168,036, filed concurrently herewith and assigned to the same assignee as the present invention. By reference that application is made part of the disclosures and teachings of the instant application.

The cure accelerators corresponding to formula I, may be prepared in accordance with the methods described in my aforementioned copending application Ser. No. 168,036, by reacting, in the presence of an inert solvent, such as toluene or benzene, a catechol of the general formula

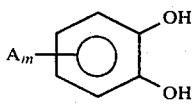
II.

with a halogenosilane of the formula

 (III)

where X is a halogen radical, e.g. chlorine, bromine, etc. where R, A, and m have the meanings above. In addition, a hydrohalide acceptor, such as pyridine, may be used to effect the above reaction. Depending on whether one or both of the hydroxyl groups is converted to an —OSiR$_3$ group will be determined by the molar concentration of the halogenosilane of formula III to the compound of formula II as is described in my copending application referred to above.

Examples of the halogenosilanes which may be used in the preparation of the novel accelerators of the instant invention include, e.g., trimethylchlorosilane, allyldimethylchlorosilane, benzyldimethylchlorosilane, t-butyldimethylchlorosilane, methyldiethylchlorosilane, propyldimethylchlorosilane, phenyldimethylchlorosilane, diethylchlorosilane, dimethylchlorosilane, diphenylchlorosilane, diphenylvinylchlorosilane, methylethylchlorosilane, n-octyldimethylchlorosilane, vinyl dimethylbromosilane, etc.

Epoxy resin compositions, heretofore have been utilized for example, as electrical insulation for electrical conductors. The cure rate of the epoxy resins has previously been of prolonged duration, e.g., often as long as 10 to 15 hours at 160°, especially in casting applications, significantly delaying utilization of said epoxy resins in a broad range of applications. Moreover, the rate of cure for epoxy resin compositions heretofore have been controlled by the selection of a suitable hardener and an accelerator which generally dictated the temperature and time required to effect curing of the epoxy composition. In the past, accelerating the cure of the resins has often been at the expense of the storage stability at ambient temperatures. In general, there has not been a simple and satisfactory means available on a commercial basis to provide for an epoxy resin formulation that exhibits a stable shelf life at ambient temperature for a desired time and yet can be made to cure rapidly when required at elevated temperatures.

It is an object of the present invention to provide a thermosetting epoxy resin composition, the reactivity of which can be controlled over a very wide range, i.e., from stability for periods of up to 1 year or more to gelation and ability to cure rapidly at elevated temperatures, often lower than are usually required.

It is an additional object of this invention to provide epoxy resin compositions containing cure accelerators which impart desirable physical properties, including favorable chemical and electrical properties in the resultant heat-cured epoxy resin.

The term "epoxy resins" is intended to include those selected from both glycidyl and non-glycidyl ether epoxides containing more than one 1,2-epoxy groups per molecule.

Such non-glycidyl ether cycloaliphatic epoxides are characterized by the absence of the ether oxygen bond, i.e., —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. These epoxides are generally prepared by epoxidizing unsaturated aliphatic hydrocarbon compounds, such as cyclic-olefins, using hydrogen peroxide or peracids such as peracetic acid and perbenzoic acid.

Other epoxy resins which may be employed in this invention such as 1,2-epoxy resins having more than one epoxy group per molecule include cycloaliphatic epoxy resins such as 3,4-epoxycyclohexylmethyl-(3,4-epoxy) cyclohexane carboxylate (sold under the trademarks ERL 4221 by Union Carbide Co. or Araldite CY 179 by Ciba Products Company), bis(3,4-epoxy 6-methylcyclohexylmethyl) adipate (sold under the trademarks ERL 4289 by Union Carbide Co. or Araldite CY 178 by Ciba Products Company), bis(2,3-epoxycyclopentyl) ether resins (sold under the trademark ERL 4205 by Union Carbide Company), 2-(3,4-epoxy)cyclohexyl-5, and 5-spiro (3,4-epoxy)-cyclohexane-m-dioxane, (sold under the trademark Araldite CY 175 by Ciba Products Company), etc.

Glycidyl ether based epoxy resins suitable for use according to the present invention include glycidyl ethers of phenolic epoxy resins such as liquid or solid bisphenol-A diglycidyl ether epoxy resins (such as those sold under trademarks as Epon 826, Epon 828, Epon 830, Epon 1001, Epon 1002, Epon 1004, etc., by Shell Chemical Company), phenol-formaldehydr novolac polyglycidyl ether epoxy resins (such as those sold under the trademarks DEN 431, DEN 438, and DEN 439 by Dow Chemical Company), epoxy cresol novolacs (such as those sold under trademarks ECN 1235, ECN 1273, ECN 1280 and ECN 1299 by Ciba Products Company), resorcinol glycidyl ethers (such as ERE 1359 made by Ciba Products Company), tetra-glycidyl tetraphenylethane (Epon 1031, made by Shell Chemical Company); glycidyl ether epoxy resins such as diglycidyl phthalate (ED-5661 by Celanese Resins Company), diglycidyl tetrahydrophthalate (Araldite CY 182 by Ciba Products Company), and diglycidyl hexahydrophthalate (Araldite CY 183 made by Ciba Products Company); and flame retardant epoxy resins such as halogen-containing bisphenol-A diglycidyl ether epoxy resins (e.g., DER 542 and DER 511 which have bromine contents of 44-48 and 18-20%, respectively, and are made by Dow Chemical Company).

The foregoing epoxy resins are well known in the art and are set forth, for example, in many patents including U.S. Pat. Nos. 2,324,483, 2,444,333, 2,494,295, 2,500,600, and 2,511,913. The combined stabilizers and curing agents used in the practice of this invention are not only effective with various epoxy resins and mixtures of epoxy resins, but they are also effective in mixtures containing reactive and nonreactive epoxy diluents (or extenders), epoxy flexibilizers and fillers.

There are many epoxy resin curing agents in use. Among the most common are the aromatic polyamines, aliphatic polyamines and their adducts, carboxylic acid anhydrides, polyamides and catalytic curing agents, as, for example, tertiary amines, imidazoles, $BF_3$ monoethylamine, and dicyanodiamide.

In addition, there are metal acetylacetonates in which the metal is aluminum, barium, beryllium, cadmium, calcium, cerous, chromic, cobaltic, cobaltous, cupric, ferric, ferrous, lead lithium, magnesium, manganic, molybdenum, nickel, potassium, titanium, zinc, zirconium, etc.

Phenolic cure accelerators are frequently used in conjunction with an initiator in the curing of epoxy resins. Among the more common accelerators are bisphenol-A (i.e., 2,2-bis(4-hydroxyphenyl) propane, catechol, resorcinol, and hydroquinone. Other phenolic accelerators include halogenated phenols such as ortho-, meta-, and parachlorophenols or bromophenols. However, such types of accelerators tend to affect adversely the stability at room temperature of the resins in which they are incorporated.

The epoxy resin compositions of the present invention were unexpectedly found to exhibit enhanced storage stability in that the compositions did not spontaneously cure or gel at room temperature (25°-35° C.) during prolonged storage. As previously noted, the curing rate of epoxy resin compositions can be tailored to cure over a time span of from five minutes to several hours based on the resin or resin mixture selected, the amount and type of accelerator utilized in relation to the cure temperature chosen, etc. Further, blends of epoxy resins such as ERL 4221 epoxy resin/ECN 1235 epoxy cresol novolac resin, or glycidyl ether and glycidyl ester pepoxy resins may be cured using the accelerators of general formula I.

The composite heat curable epoxy resins of the present invention are characterized by excellent shelf life and enhanced resistance to adverse conditions and availability as a one-component, ready to use package, not requiring the blending of ingredients immediately prior to utilization. The epoxy resin compositions generally consist of a mixture of a resin, an organic titanate or zirconate cure initiator or curing agent and an accelerator of formula I.

Some of the applications in which the curable compositions of the present invention can be used, are, for example, protective coatings, liquid injection molding compounds, wire insulation, encapsulation of electronic components, pultrusion, laminates, bulk molding compounds (BMC); e.g., as housings for motors, grills for automobiles, etc.

The organic titanate initiators which are added to the epoxy resin composition to initiate the cure of the epoxy resins include chelated titanates such as acetylacetonate titanate, lactate titanate, triethanolamine titanate, polyhydroxystearate titanate, a glycolate titanate (e.g., tetraoctylene glycol titanate containing approximately 7.8% Ti and sold under the trademark Tyzor OG by E.I. du Pont de Nemours and Company or di-n-butyl hexylene glycol titanate), and nonchelated titanates such as tetraisopropyl titanate (TPT), tetrabutyl titanate, polymerized tetrabutyl titanate, and tetrakis (2-ethylhexyl) titanate (TOT). In general, the chosen titanate should be present in the mixture in a concentration between 0.03 and 15% by weight, based on the weight of the epoxy resin, with optimum cure rates generally being obtained utilizing titanate concentrations between 1 to 10%, by weight, of the epoxy resin. The amount of curing agent used will depend on such factors as type of epoxy resin used, temperature at which cure is to take place, type of accelerator used, etc.

In place of organic titanates, organic zirconate curing agents can be used for the curing of the epoxy resins, and these include, for example, zirconium acetylacetonate, zirconium-tert-butoxide, zirconium hexafluoroacetylacetonate, zirconium naphthenate (sold by Witco Chemical Company, Incorporated), zirconium propoxide and zirconium isopropoxide (sold by Ventron Corporation), etc.

Such zirconate curing agents can be used in amounts similar to those for the titanate curing agents, that is, the chosen zirconate should be present in a concentration between 0.01 and 15% by weight, based on the weight of the epoxy resin, with a preferred concentration between 0.01 and 10% by weight, of the epoxy resin.

In order that those skilled in the art may better understand how the present invention may be practiced, the following examples are given by way of illustration and not by way of limitation. All parts are by weight and A is monovalent hydrogen, unless otherwise indicated.

EXAMPLE 1

A mixture of 100 parts Epon 828, 1.5 parts Tyzor TPT and 6.9 parts of the accelerator corresponding to formula I where both Q's are Si—$(CH_3)_3$ and A is hydrogen [formed by reacting catechol with $(CH_3)_3$ SiCl] was prepared. The gelation time of this composition was measured with a Sunshine Gel Meter (Sunshine Scientific Instruments Co., Philadelphia, Pa.)

The following Table I shows the gel times of the aforesaid compositions at varying temperatures:

TABLE I

| Test No. | T° C. | Gel Time (min.) |
|---|---|---|
| 1 | 50 | 17280 (~12 days) |
| 2 | 150 | 10.5 |
| 3 | 160 | 6.7 |
| 4 | 170 | 4.6 |
| 5 | 180 | 3.8 |
| 6 | 190 | 3.0 |

For comparison, when the accelerator was eliminated, the otherwise same composition did not cure even when heated at 150° C. in excess of 24 hours. To show that storage stability is diminished when a non-silylated or unsubstituted catechol accelerator is used in lieu of catechol derived accelerators of the present invention, another test was conducted wherein a mixture of 100 parts Epon 828, 1.5 parts TPT and 6.9 parts catechol was prepared. The gelation time at 50° C. of this composition measured with the aforementioned gel equipment was approximately 0.8 minute.

EXAMPLE 2

A thermosetting epoxy resin composition was prepared by mixing 100 parts Epon 828 with 1.53 parts Tyzor TPT, and 8.4 parts of an accelerator corresponding to formula I, where both Q's are Si—$(CH_3)_3$, A is a t-butyl radical in the meta position to one of the silyloxy groups, and m is 1 [prepared by reacting t-butyl catechol and $(CH_3)_3SiCl$]. The gelation time of this composition at 150° C., measured with the Sunshine Gel Meter, was 18.0 minutes.

EXAMPLE 3

A thermosetting epoxy resin composition was prepared by mixing 100 parts Epon 828 with 1.53 parts Tyzor TPT, and 8.1 parts of an accelerator corresponding to formula I, where both Q's are Si—$(CH_3)_3$, A is a $NO_2$ radical in the metal position to one of the silylyoxy groups, and m is 1 [prepared by reacting nitro-catechol and $(CH_3)_3SiCl$]. The gelation time of this composition at 150° C. was 4.7 minutes.

EXAMPLE 4

A thermosetting epoxy resin composition was prepared by mixing 100 parts Epon 828 with 3.4 parts Tyzor OG and 4.9 parts of an accelerator corresponding to formula I where one Q is Si—$(CH_3)_3$, the other Q is hydrogen, and A is hydrogen. The gelation time of this composition at 150° C. was 4.1 minutes.

EXAMPLE 5

A thermosetting epoxy resin composition was prepared by mixing 100 parts Epon 828 with 1.53 parts Tyzor TPT and 4.91 parts of an accelerator corresponding to formula I where one Q is Si—$(CH_3)_3$, the other Q is hydrogen, and A is hydrogen. The gelation time of this composition at 150° C. was 1.9 minutes.

EXAMPLE 6

A thermosetting epoxy resin composition was prepared by mixing 100 parts Epon 828 with 2.63 parts zirconium 2,4-pentanedionate and 4.9 parts of an accelerator corresponding to formula I where one Q is Si—$(CH_3)_3$, and the other Q is hydrogen and R is hydrogen. The gelation time of this composition at 150° C. was 17.4 minutes.

EXAMPLE 7

A thermosetting epoxy resin composition was prepared by mixing 100 parts Epon 828 with 3.4 parts Tyzor OG and 6 parts of an accelerator corresponding to formula I where one Q is

and the other Q is hydrogen. The gelation time of this composition at 150° C. was 23.4 minutes.

EXAMPLE 8

A thermosetting epoxy resin composition was prepared by mixing 100 parts Epon 828 with 1.5 parts Tyzor TPT and 6 parts of an accelerator as in Example 7. The geleation time of this composition at 150° C. was 8.3 minutes.

EXAMPLE 9

A thermosetting epoxy resin composition was prepared by mixing 100 parts Epon 828 with 1.53 parts Tyzor TPT and 8.37 parts of an accelerator corresponding to formula I where both Q's are Si—$(CH_3)_3$, A is a t-butyl radical in the meta position to one of the silyloxy groups, and m is 1. The gelation time of this composition at 150° C. was 18.15 minutes.

EXAMPLE 10

A thermosetting epoxy resin composition was prepared by mixing 100 parts Epon 828 with 1.53 parts Tyzor TPT and 7.56 parts of an accelerator corresponding to formula I where one Q is —Si—$(CH_3)_2$t-butyl, the other Q is hydrogen, and A is hydrogen. The gelation time of this composition at 150° C. was 9.85 minutes.

EXAMPLE 11

A thermosetting epoxy resin composition was prepared by mixing 100 parts Epon 828 with 3.37 parts Tyzor OG and 6.4 parts of an accelerator corresponding to formula I where Q is Si—$(CH_3)_3$, the other Q is hydrogen, A is a t-butyl radical in the metal position to one of the silyloxy groups, and m is 1. The gelation time of this composition at 150° C. was 3.6 minutes.

EXAMPLE 12

A thermosetting epoxy resin composition was prepared by mixing 100 parts Epon 828 with 1.53 parts Tyzor TPT and 6.4 parts of an accelerator as in Example 11. The gelation time of this composition at 150° C. was 2.3 minutes.

Although the above examples are directed to only a few of the very many variables of the formulations representing the novel accelerators of the present invention, it should be understood that the curable compositions can comprise a much broader variety and mixture of epoxy resins, curing agents such as the titanates and zirconates, and accelerators as shown in the description preceding these examples.

What I claim as new and desire to secure by Letters Patent of the United States is:

1. A composition of matter comprising an epoxy resin, a cure initiator, and an accelerator of the general formula

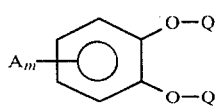

where Q is independently selected from the class consisting of Si—R$_3$ or hydrogen and, R is independently selected from the class consisting of hydrogen, monovalent alkyl (including aralkyl) groups of from 1 to 8 carbon atoms; aryl, alkaryl, vinyl, and allyl radicals, A is independently selected from alkyl radicals the same as R above, halogen and the nitro radical, where A can be ortho-, meta-, or para- to either of the —OQ radicals, and m is an integer from 1 to 2, inclusive, with the proviso, that only one Q can be hydrogen, and only one R can be hydrogen on one silicon atom.

2. A composition of matter as in claim 1, wherein the cure initiator is a titanium or zirconium ester.

3. A composition of matter as in claim 1 wherein the accelerator has the formula

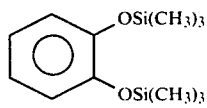

4. A composition of matter as in claim 1 wherein the accelerator has the formula

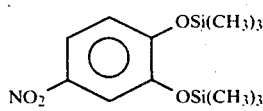

5. A composition of matter as in claim 1 wherein the accelerator has the formula

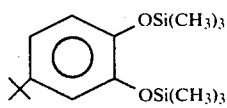

6. A composition of matter as in claim 1, wherein the accelerator has the formula

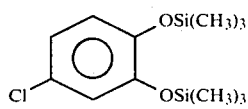

7. A composition of matter as in claim 1, wherein the accelerator has the formula

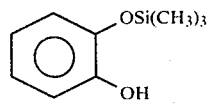

8. A composition of matter as in claim 1, wherein the accelerator has the formula

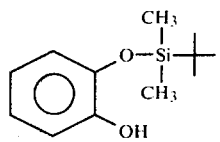

9. A composition of matter as in claim 1 wherein the accelerator has the formula

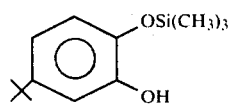

10. A composition of matter as in claim 1, wherein the accelerator has the formula

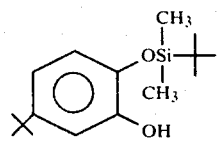

11. A composition of matter as in claim 1 wherein the cure initiator is a zirconium ester and the accelerator has the general formula

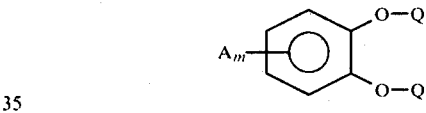

where Q is independently selected from the class consisting of Si—R$_3$ or hydrogen and, R is independently selected from the class consisting of hydrogen, monovalent alkyl (including aralkyl) groups of from 1 to 8 carbon atoms; aryl, alkaryl, vinyl, and allyl radicals, A is independently selected from alkyl radicals the same as R above, halogen and the nitro radical, where A can be ortho-, meta-, or para- to either of the —OQ radicals, and m is an integer from 1 to 2, inclusive, with the proviso, that only one Q can be hydrogen, and only one R can be hydrogen on one silicon atom.

12. A composition of matter as in claim 1, wherein the cure initiator is a titanium ester and the accelerator has the general formula

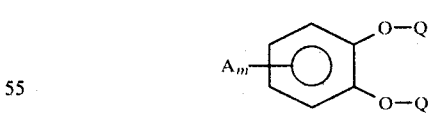

where Q is independently selected from the class consisting of Si—R$_3$ or hydrogen and, R is independently selected from the class consisting of hydrogen, monovalent alkyl (including aralkyl) grousp of from 1 to 8 carbon atoms; aryl, alkaryl, vinyl, and allyl radicals, A is independently selected from alkyl radicals the same as R above, halogen and the nitro radical, where A can be ortho-, meta-, or para- to either of the —OQ radicals, and m is an integer from 1 to 2, inclusive, with the proviso, that only one Q can be hydrogen, and only one R can be hydrogen on one silicon atom.

13. A composition of matter as in claim 2 wherein the cure initiator is a titanate ester and the accelerator is a compound of the formula

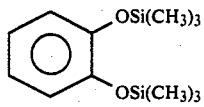

14. A composition of matter as in claim 1 wherein the cure initiator is a titanate ester and the accelerator is a compound of the formula

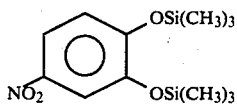

15. A composition of matter as in claim 1 where in the cure initiator is a titanate ester and the accelerator is a compound of the formula

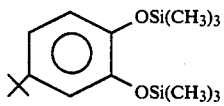

16. A method for curing an epoxy resin which comprises
    (1) forming a mixture of ingredients comprising an epoxy resin, a cure initiator, and an accelerator of the general formula

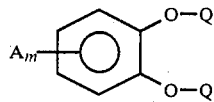

where Q is independently selected from the class consisting of Si—$R_3$ or hydrogen and, R is independently selected from the class consisting of hydrogen, monovalent alkyl (including aralkyl) groups of from 1 to 8 carbon atoms; aryl, alkaryl, vinyl, and allyl radicals, A is independently selected from alkyl radicals the same as R above, halogen and the nitro radical, where A can be ortho-, meta-, or para- to either of the —OQ radicals, and m is an integer from 1 to 2, inclusive, with the proviso, that only one Q can be hydrogen, and only one R can be hydrogen on one silicon atom.
    (2) heating the aforesaid mixture of ingredients at a temperature and for a time sufficient to effect curing of said epoxy resin.

17. A method for curing an epoxy resin according to claim 16, wherein the cure initiator is a titanium ester.
18. A method for curing an epoxy resin according to claim 16, wherein the cure initiator is a zirconium ester.
19. The heat cured product of claim 1.
20. The heat cured product of claim 2.
21. The heat cured composition of claim 3.
22. The heat cured composition of claim 4.
23. The heat cured composition of claim 5.
24. The heat cured composition of claim 6.
25. The heat cured composition of claim 7.
26. The heat cured composition of claim 8.
27. The heat cured composition of claim 9.
28. The heat cured composition of claim 10.
29. The heat cured composition of claim 11.
30. The heat cured composition of claim 12.
31. The heat cured composition of claim 13.
32. The heat cured composition of claim 14.
33. The heat cured composition of claim 15.

* * * * *